United States Patent [19]
Nellessen

[11] Patent Number: 6,018,580
[45] Date of Patent: Jan. 25, 2000

[54] NON VOLATILE AUTOMATIC TELEPHONE DIALER CIRCUIT

[76] Inventor: Leonard J Nellessen, P.O. Box 5945, Carefree, Ariz. 85377

[21] Appl. No.: 08/946,668

[22] Filed: Oct. 7, 1997

[51] Int. Cl.[7] .................................................. H04M 1/26
[52] U.S. Cl. ............................ 379/355; 379/216; 379/359
[58] Field of Search ...................... 379/355, 356, 379/357, 359, 362, 216

[56] References Cited

U.S. PATENT DOCUMENTS

| | | | |
|---|---|---|---|
| 3,925,622 | 12/1975 | Robinson | 379/40 |
| 4,371,751 | 2/1983 | Hilligoss, Jr. et al. | 379/41 |
| 4,417,100 | 11/1983 | Carlson et al. | 379/54 |
| 4,450,320 | 5/1984 | Ostermann et al. | 379/45 |
| 4,492,820 | 1/1985 | Kennard et al. | 379/46 |
| 4,802,208 | 1/1989 | Yeh | 379/216 |
| 4,866,764 | 9/1989 | Barker, III | 379/355 |
| 4,985,918 | 1/1991 | Tanaka et al. | 379/356 |
| 5,204,894 | 4/1993 | Darden | 379/355 |
| 5,239,576 | 8/1993 | Yoshida et al. | 379/355 |
| 5,309,506 | 5/1994 | Alexander | 379/53.02 |
| 5,333,172 | 7/1994 | Stevens | 379/355 |
| 5,475,751 | 12/1995 | McMonagle, Jr. et al. | 379/355 |
| 5,495,525 | 2/1996 | Walker et al. | 379/355 |
| 5,553,138 | 9/1996 | Heald et al. | 379/413 |
| 5,742,666 | 4/1998 | Alpert | 379/575 |

*Primary Examiner*—Forester W. Isen
*Assistant Examiner*—Jacques M. Saint-Surin
*Attorney, Agent, or Firm*—Ellis, Venable, Busam & Wittenberg, LLP

[57] ABSTRACT

An automatic telephone number dialing circuit powered from a standard telephone network wire for storing telephone numbers using non-volatile memory including a one-touch dialing device that enables a user to automatically dial a plurality of telephone numbers that are pre-programmed in non-volatile read only memory of an integrated circuit.

13 Claims, 2 Drawing Sheets

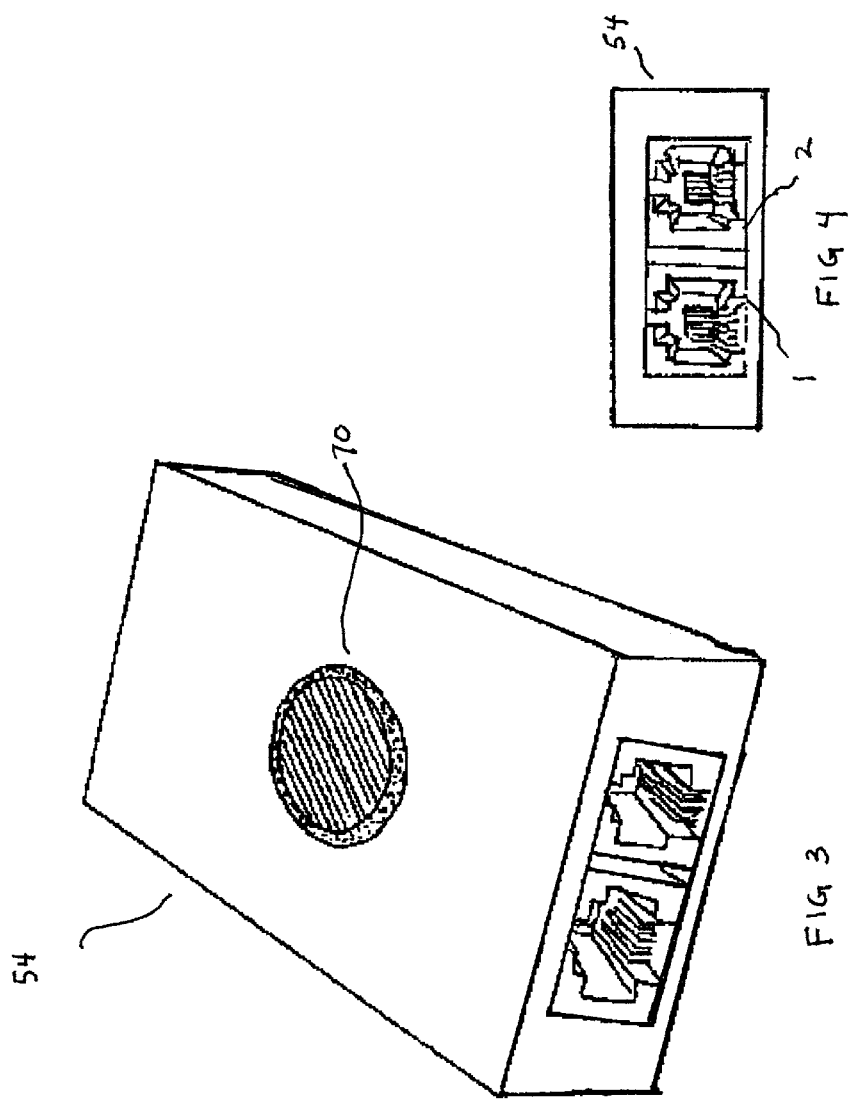

NON VOLATILE AUTOMATIC TELEPHONE DIALER CIRCUIT

FIELD OF THE INVENTION

The present invention relates to the telecommunications art, and has particular reference to a novel circuit for storing telephone numbers using non-volatile memory for dialing when needed. More particularly, the present invention involves the use of a one-touch dialing device that enables a user to dial a plurality of telephone numbers that come pre-programmed in a read only memory on an integrated circuit.

BACKGROUND

Many telephones available on the market today incorporate circuitry capable of dialing pre-selected telephone numbers. The conventional means for accomplishing this task consists of the touching of a single button that triggers the circuitry to access a desired telephone number that is stored in electronic memory. However, the electronic memory circuitry normally requires an outside power source to maintain the storage of the telephone numbers. This type of memory storage is called volatile memory.

It is well known that many individuals have an extremely difficult time programming pre-set telephone numbers in many modem telephone units. The degree of difficulty required to program these devices indicates a need for programming simplicity. A device that simplifies the programming and storage of pre-determined telephone numbers, the dialing process for these numbers, and the elimination of an outside power source, is an improvement over the conventional means for accomplishing standard telephone number dialing using pre-programmed dialing buttons.

The external power source for volatile circuits usually consists of a low-power battery or AC plug-in adapter into the telephone itself. However, a major drawback of volatile memory is the requirement that the electronic power source remain constant. If the external power source is interrupted by insufficient battery power, or a power outage due to an electrical storm, the entire electronic memory used for storing telephone numbers vanishes. Should a typical power loss occur, the entire electronic memory must be reprogrammed with telephone numbers.

Prior inventions have included circuitry to accomplish a non-volatile memory device capable of storing pre-determined telephone numbers. For example, U.S. Pat. No. 5,495,525 issued to Walker et al. ("Walker") teaches a device in which a pre-determined telephone number dialing circuit must be pre-wired. The Walker dialing circuit requires that a digital counter integrated circuit be pre-wired to an integrated dialing circuit so that the telephone number corresponds to a given wiring pattern. When the counter cycles through its full count in binary, the Walker dialing circuit dials a pre-determined telephone number, depending on how the wires have been arranged between the dialer circuit and the counter circuitry. A tremendous limitation on this method is that it precludes the user from changing the telephone number, unless the entire circuit is rewired to correspond to a new telephone number. Rewiring the circuitry requires not only knowledge of electronics and integrated circuits, it also requires that the circuitry not be hard wired on a printed circuit board.

Other patented devices discuss similar approaches to dialing pre-programmed telephone numbers. However, none of these patented inventions include a non-volatile memory circuit that allows the user the flexibility to change or update the pre-determined telephone number by simply changing or reprogramming a read only memory device. The flexibility to allow a user to change a single, or even multiple, telephone numbers is a substantial improvement over the prior art.

SUMMARY OF THE INVENTION

It is an object of the present invention to provide a device with electronic circuitry capable of automatically dialing a pre-determined telephone number by depressing a single key or button.

It is a further object of the present invention for the electronic circuitry to consist of a non-volatile memory circuit capable of storing a pre-determined telephone number.

It is a further object of the present invention for the non-volatile memory circuit to consist of a programmable micro controller integrated circuit containing a read only memory. The micro controller is easily removable and interchangeable from an integrated circuit bay on a printed circuit board.

It is a further object of the present invention for the micro controller to be pre-programmed with telephone numbers and other pertinent information required for dialing purposes.

It is a further object of the present invention for the electronic circuitry to work under pulse or tone dialing conditions.

It is a further object of the present invention for the electronic circuitry to utilize power from standard telephone power sources, rather than from an external power source such as a battery or AC power supply.

It is a further object of the present invention for the electronic circuitry to stabilize power for a short period of time from the standard telephone power source after a user activates the dialing button apparatus for before commencing the telephone number dialing sequence.

BRIEF DESCRIPTION OF THE DRAWINGS

The novel features that are considered characteristic of the invention are set forth with particularity in the appended claims. The invention itself, however, both as to its structure and its operation together with the additional object and advantages thereof, will best be understood from the following description of the preferred embodiment of the present invention when read in conjunction with the accompanying drawings wherein:

FIG. 2 is a perspective view of the single touch, automatic dialing unit according to the present invention;

FIG. 3 is a top view of the device displaying the touch button that initiates the dialing sequence when depressed;

FIG. 4 is a front view of the housing for the device where RJ 45 telephone wires may be plugged in from both the telephone and a line coming from a standard telephone network respectively.

DESCRIPTION OF PREFERRED EMBODIMENTS

Figure 1:
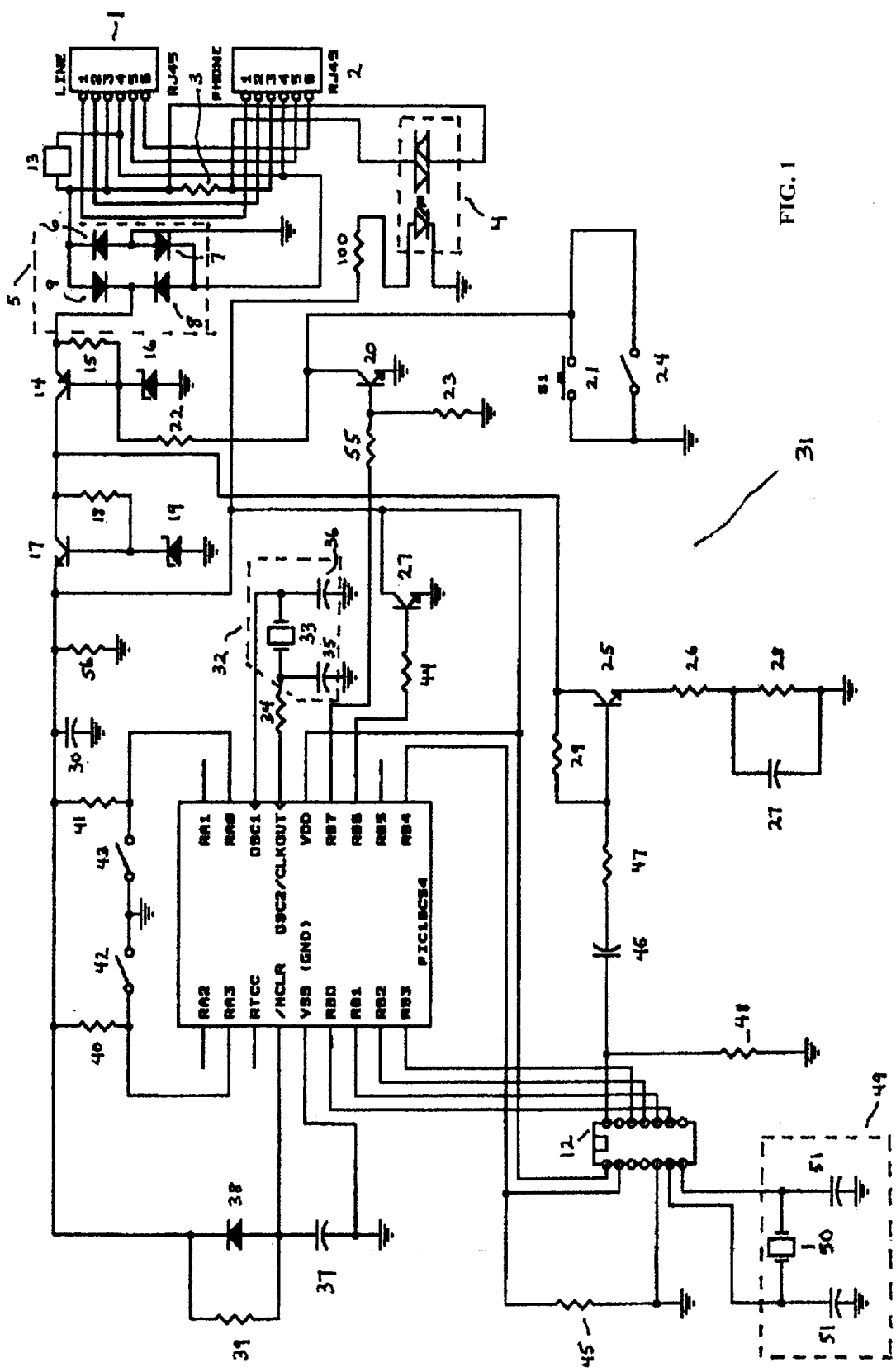
FIG. 1 illustrates a schematic of the electrical circuit according to the present invention connected in the standard mode prepared for dialing a pre-determined telephone number.

Described below is the preferred embodiment of the present invention. Many of the features of the different embodiments are fabricated in a similar manner. Where variances in the construction of the various embodiments exist, these variations will be discussed together in the same section.

Referring to FIG. 1, a non volatile telephone dialing circuit 31 is preferably hard wired to a printed circuit board. The non volatile telephone dialing circuit 31, is electrically coupled to the telephone network by a telephone network having six contacts respectively, such as a RJ45 female jack 1. Another connection 2 may be provided in order to electrically couple a telephone handset to the same telephone network connection. Female jack 1 receives a telephone wire equipped with a male RJ45 jack from a standard telephone network, while female jack 2 receives a telephone wire equipped with a male RJ45 jack from a standard telephone. Contacts one, two, four, five, and six from female jacks 1 and 2 are electrically coupled together. Contact three of female jack 1 is coupled to diodes 6 and 9 at a junction through resistor 333, while contact four of female jack 2 is electrically coupled to the junction of diodes 7 and 8. Contact three of female jack 1 is also coupled to contact four of female jack 2 through resistor 333 and 200 Volt MOV 13. The MOV 13 provides protection in the event of an electrical surge on the telephone line. Contact three of female jacks 1 and 2 are electrically coupled via a current limiting resistor 3. Resistor 3 is also coupled to a bridge rectifier 5 by a resister 333.

Power for the non volatile telephone dialing circuit 31 is derived from the telephone network line voltage. In the preferred embodiment, this is accomplished with a bridge rectifier 5 coupled to circuitry configured to allow power regulation and power control. The bridge rectifier 5 comprises of diodes 6, 7, 8, and 9 such that the cathodes of diodes 6 and 7 are electrically coupled together, the anodes of diodes 8 and 9 are electrically coupled together, and anode of diode 6 is electrically coupled to the cathode of diode 8, while the anode of diode 7 is electrically coupled to the cathode of diode 9. The junction of diodes 6 and 7 is electrically coupled to electrical ground. The diodes 6–9 can be Motorola 1N4004 diodes or the like.

Power is received at the collector of a pnp transistor 14 through the bridge rectifier 5 and the combination of a parallel resistor 15 and a zener diode 16. The junction of diodes 8 and 9 is electrically coupled to transistor 14 at the emitter. The base and emitter of transistor 14 are electrically coupled via parallel resistor 15. The base of transistor 14 is electrically coupled to the anode of zener diode 16, while the cathode of zener diode 16 is electrically coupled to ground. The collector of transistor 14 is electrically coupled to the collector of an npn transistor 17. The base and collector of transistor 17 are electrically coupled via parallel resistor 18. The base of transistor 17 is electrically coupled to the anode of zener diode 19, while the cathode of zener diode 19 is electrically coupled to ground.

An external button 70, as shown in FIG. 2, may be mechanically coupled to an electrical switch 21 establishes a mechanical, user-controlled input that initiates the operation of the non volatile telephone dialing circuit 31. Prior to depression of the external button 70, the telephone dialing circuit 31 is in a standby mode, transistor 14 has no base current and therefore no collector current to bias transistor 17, resistor 18, and zener diode 19 which establishes the supply voltage for other circuitry in the telephone dialing circuit 31.

Depression of the external button 70 closes the electrical switch 21 and establishes a bias for transistor 14. When current is supplied through transistor 14, Zener diode 19 and parallel resistor 18 establish the proper conditions for forward biasing transistor 17. The selection of the zener diode 19 and current limiting resistor 18 should be selected so as to properly bias the micro controller within the range required by the micro controller manufacturer. This selection should also take into account the voltage drop of the base-emitter junction of transistor 17. In the preferred embodiment the selection of these components establish a voltage of approximately 4.3 volts at the emitter of transistor 17. A resistor 100 is electrically coupled between the emitter of transistor 17 and the cathode of a diode representing a primary terminal of an optical relay 4 of which the anode and the second primary terminal is grounded. As the voltage at the emitter of transistor 17 rises, current through a resistor electrically coupled between the emitter of transistor 17 and the primary terminal of the optical relay 4 results in an off-hook condition for the circuit 31.

This voltage at the emitter of transistor 17 provides the supply voltage for the integrated micro controller 11 and the integrated dialer circuit 12. The micro controller 11, contains non-volatile memory in the form of read only memory (ROM). The ROM is typically pre-programmed to contain the telephone numbers that will be dialed when a user depresses the button that closes the electrical switch 21. The micro controller 11, contains sixteen pins for both input and output, as well as power and ground. The dialer chip 12 contains all the circuitry for performing dialing functions for the device 31. The preferred embodiment of micro controller 11 is a the Microchip PIC16C5X, while the preferred embodiment of the dialer circuit 12 is the National Semiconductor TP5088.

The manufacturer specifications of the micro controller and the dialer circuit provide the recommended circuitry necessary for basic operational conditions. Accordingly, the present invention has adopted those recommendations and are described hereafter.

Pin five of the micro controller 11 is electrically coupled to ground, while pin four of the micro controller 11 is electrically coupled to ground via capacitor 37, and to the emitter of transistor 17 via the parallel combination of diode 38 and resistor 39. Capacitor 37 and resistor 39 create a turn on transient. The purpose of the turn on transient is to prevent micro controller 11 operation until the bias voltage as stabilized. Diode 38 is added to clamp the voltage at pin four of the micro controller 11 to the bias voltage at the emitter of transistor 17 to prevent damage to the micro controller 11 by high voltages stored on capacitor 37. In the preferred embodiment, the zener diode 19 and the parallel resister 18 are selected so that the bias voltage after transistor 17 is approximately 4.3 Volts D.C.

Pins sixteen and fifteen of the micro controller 11 are electrically coupled to a first oscillator circuit 32. The oscillator circuit 32, when combined with the internal circuitry of the micro controller create a system clock for the micro controller 11. The oscillator circuit 32 comprises a crystal 33, having a cathode and an anode, a resistor 34, and a pair of capacitors 35 and 36 respectively. The preferred crystal has a resonant frequency of 500 kHz and is electrically coupled to ground at its anode by capacitor 36, and by capacitor 35 at its cathode at the other end. Pin fifteen of the micro controller 11 is electrically coupled to resistor 34 in series with the cathode of crystal 33, while pin sixteen of the micro controller 11 is electrically coupled to the anode of crystal 33.

Pin ten of the micro controller 11 is electrically coupled to ground via resistor 45. Additionally, pin ten is also electrically coupled to pin two of the dialer circuit 12. Pin two of the dialer circuit 12 can then be controlled by the output of pin ten of the micro controller 11 but have a default condition of being grounded or at logic low. This prevents the dialer circuit 12 from producing output until the micro controller 11 has stabilized and is ready to dial.

Once the turn on transient has expired, the bias voltage at the emitter of transistor 17 is presumed stable and the micro controller 11 initiates the program code that takes control of the telephone dialing circuit 31.

As initiated by the program code, the micro controller asserts a positive voltage on pin thirteen. This forward biases npn transistor 20 and draws sufficient current to keep transistor 14 forward biased. This allows the circuit 31 to operate without having to keep the button of the electrical switch 21 depressed. Pin thirteen of the micro controller 11 is tied to the base of transistor 20 via series resistor 44. The collector of transistor 20 is electrically coupled to the base of transistor 14 via series resistor 22, while the base of transistor 20 is electrically coupled to ground via series resistor 23. The emitter of transistor 20 is also tied to ground. The terminals of the electrical switch 21, and a jumper switch 24 provided for test purposes, are electrically coupled in parallel across the collector and emitter of transistor 20.

Operation according to the program code continues as the status of switch 42 and switch 43 are determined. If switch 42 is in the open position, the circuit 31 is set for pulse dialing. If switch 42 is in the closed position, the circuit 31 is set for tone dialing. Switch 43 allows the user to select from two possible pre-programmed telephone numbers stored in the ROM of the micro controller 11 depending on whether it is in the open or closed position. Pin two and seventeen of the micro controller 11 are electrically coupled to ground via jumper switches 42 and 43, respectively. Pin two and seventeen of the micro controller 11 are also electrically coupled to the bias voltage at the emitter of transistor 17 via series resistors 40 and 41, respectively. When jumper 42 is in the closed position, pin two of the micro controller 11 grounded. When jumper 43 is in the closed position, pin seventeen of the micro controller 11 is grounded.

A second oscillator circuit 49, with a crystal 50 having a cathode and an anode, and capacitors 51 and 52, are electrically coupled to pins six and seven respectively of the dialer circuit 12. As required by the design and specification of the dialer circuit 12, the resonant frequency of the crystal is 3.50 MHz. The cathode of crystal 50 is electrically coupled to ground via capacitor 51 and is electrically coupled to pin six of the dialer circuit 12. The anode of crystal 50 is electrically coupled to ground via capacitor 52 and is electrically coupled to pin seven of the dialer circuit 12. Pin five of the dialer circuit 12 is tied directly to ground.

At the appropriate time as determined by the executable program in the ROM of micro controller 11, and depending on the status of the switches 42 and 43, the micro controller 11 begins transmitting information via pins six through nine of the micro controller 11 which are electrically coupled to pins nine through twelve of the dialer circuit 12 respectively.

Output from the dialer circuit 12 is buffered by the composition of transistor 25 and surrounding circuitry. Pin fourteen of dialer circuit 12, is electrically coupled to the base of transistor 25 by a series combination of capacitor 46 and resistor 47 in parallel with resistor 48 which is then electrically coupled directly to ground. The collector of transistor 25 is electrically coupled to the collector of transistor 14. The tones generated by the dialer circuit 12 are thereafter imposed on the telephone line through the emitter current of transistor 14, the diodes of the bridge rectifier 5, and the resistors 333 and 3.

As the program in the ROM of micro controller 11 executes, and the information is transmitted between the two circuits 11 and 12, the circuit 31 executes a standard dialing sequence (get dial tone, dial numbers, ring telephone until answer is received from other telephone). When the dialing sequence is complete, the telephone dialing circuit 31 shuts down. First the micro controller asserts a low voltage on pin thirteen thereby cutting off transistor 20. Transistor 20 is electrically coupled to pin thirteen of the micro controller 11 by a resistor 55. As a result, transistor 14 has no base current and thereby stops supplying current to transistor 17. As the voltage at the emitter of transistor 17 begins to collapse, the micro controller asserts a high voltage on pin twelve resulting in a forward bias of npn transistor 27. Transistor 27 is electrically coupled to pin twelve of the micro controller 11 by a resistor 44. This effectively discharges capacitor 30 and disables the micro controller 11 and resets the optical relay 4 so that the telephone dialing circuit goes back to a on-hook condition. A path to electrical ground for any remaining charge at the emitter of transistor 17 is provided by resistor 56. Thus the circuit 31 is returned to its original state, and all power is shut off to the circuit 31.

Referring to FIG. 2, the figure displays a housing 54, with the button 70 which controls the electrical switch 21 of FIG. 1, located in the approximate middle of the housing 54. When the button 70 is depressed, it activates the circuit 31 of FIG. 1 to dial the pre-determined telephone number stored in ROM. Referring to FIG. 3, the figure displays the pair of female RJ45 jacks 1 and 2 respectively, where a standard telephone line equipped with male jacks may be inserted to connect circuit 31 of FIG. 1 to the telephone network. Referring to FIG. 4, the figure displays the frontal view of the RJ45 jacks 1 and 2.

It is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limiting. Rather, the scope of the invention described herein is limited only by the claims appended hereto.

What is claimed is:

1. A non-volatile memory circuit for automatically dialing a telephone number comprising:

a) at least one connection to a telephone network wire, said telephone network wire having an electrical input and an electrical output, b) a telephone dialer circuit, said telephone dialer circuit having the capability to dial a telephone number using a tone or a pulse dialing mode, c) a micro controller circuit having a non-volatile memory storage, said non-volatile memory storage being capable of storing at least one telephone number, d) a plurality of jumper switches having an on and an off state, i) said plurality of jumper switches being capable of:

a) selecting the tone dialing mode in the telephone dialer circuit when a first jumper is in the on state, and, b) selecting the pulse dialing mode in the telephone dialer circuit when the first jumper is in the off state, and, c) choosing one of at least one telephone number stored in said non-volatile memory when a second jumper is in the on state, e) a latch circuit having an on and an off state, f) an electrical switch capable of being in an on or an off state,
   i) when said electrical switch is placed in the on state, the electrical switch receives a current from said first telephone network wire to flow throughout the non-volatile memory circuit for automatically dialing a telephone number, thereby initiating the latch circuit to change to the on state and remain in the on state until the telephone dialer circuit completes a dialing sequence,
   ii) said dialing sequence comprises:
      a) the micro controller providing one of the plurality of stored telephone numbers in said non-volatile memory to the dialing circuit,
      b) the dialing circuit dialing one of the plurality of stored telephone numbers,
   iii) when said dialing sequence has completed, said latch circuit returns to the off state,
   iv) when said latch circuit is in the off state, no current will flow in the non-volatile circuit, said latch circuit is electrically coupled to said micro controller circuit, said latch circuit is electrically coupled to said electrical switch, said telephone dialer circuit is electrically coupled to said micro controller circuit, said plurality of jumper switches are electrically coupled to the micro controller circuit.

2. The non-volatile circuit of claim 1 wherein a second telephone connection having an electrical input and an electrical output, is electrically coupled to a telephone handset,
   a) said second telephone connection is electrically coupled to the at least one connection to a telephone network wire,
   b) said input of said second telephone wire being capable of receiving a second standard telephone wire that is electrically coupled to a second telephone network wire that is capable of conducting electrical current to provide power to the telephone handset,
   c) said output of said second telephone wire being capable of conducting pulse or tone dialing signals.

3. The non-volatile circuit in claim 1, wherein said micro controller is a Microchip PIC16C5X integrated circuit, having a programmable read only memory capable of storing a plurality of telephone numbers.

4. The non volatile circuit in claim 1, wherein said dialer circuit is a National Semiconductor TP5008 integrated circuit.

5. The non volatile circuit in claim 1, wherein said electrical switch is capable of being momentarily placed in the on state by a resilient button, said resilient button being mechanically coupled to said electrical switch.

6. The electrical switch in claim 5, wherein when said resilient button is depressed, the dialer circuit receives the telephone numbers stored in said non-volatile memory in said micro controller in electronic form and the micro controller initiates said dialer circuit to begin a dialing sequence to dial said stored number.

7. The non volatile circuit in claim 1, wherein the input and output of the connection of the non-volatile memory circuit to the telephone network wire is protected via a surge protecting circuit.

8. A method of manufacturing a device for automatically dialing a telephone number using a non-volatile memory circuit by:
   a) providing at least one connection to a telephone network wire, said telephone network wire having an input and an output,
   b) providing a telephone dialer circuit, said telephone dialer circuit having the capability to dial a telephone number using a tone or a pulse dialing mode,
   c) providing a micro controller circuit having a non-volatile memory storage, said non-volatile memory storage being capable of storing at least one telephone number,
   d) providing a plurality of jumper switches having an on and an off state,
      i) said plurality of jumper switches being capable of:
         a) selecting the tone dialing mode in the telephone dialer circuit when a first jumper is in the on state, and,
         b) selecting the pulse dialing mode in the telephone dialer circuit when the first jumper is in the off state, and,
         c) choosing one of at least one telephone numbers stored in said non-volatile memory when a second jumper is in the on state,
   e) providing a latch circuit having an on and an off state,
   f) providing an electrical switch capable of being in an on or an off state,
      i) when said electrical switch is placed in the on state, the electrical switch receives a current from said first telephone network wire to flow throughout the non-volatile memory circuit for automatically dialing a telephone number, thereby initiating the latch circuit to change to the on state and remain in the on state until the telephone dialer circuit completes a dialing sequence,
      ii) said dialing sequence comprises:
         a) the micro controller providing one of the plurality of stored telephone numbers in said non-volatile memory to the dialing circuit,
         b) the dialing circuit dialing one of the plurality of stored telephone numbers,
      iii) when said dialing sequence has completed, said latch circuit returns to the off state,
      iv) when said latch circuit is in the off state, no current will flow in the non-volatile circuit, said latch circuit is electrically coupled to said micro controller circuit,
   g) electrically coupling said latch circuit to said electrical switch,
   h) electrically coupling said telephone dialer circuit to said micro controller circuit,
   i) electrically coupling said plurality of jumper switches to the micro controller circuit.

9. The method of manufacturing a device for automatically dialing a telephone number using a non-volatile memory circuit as in claim 8 by:
   a) electrically coupling a second telephone connection having an input and an output, to a telephone handset,
   b) electrically coupling said second telephone connection to the at least one connection to a telephone network wire,
   c) electrically coupling said input of said second telephone wire being capable of receiving a second standard telephone wire to a second telephone network wire that is capable of conducting electrical current to provide power to the telephone handset, said output of said second telephone wire being capable of conducting pulse or tone dialing signals.

10. The method of claim 8, wherein said micro controller is a Microchip PIC16C5X integrated circuit, having a programmable read only memory capable of storing a plurality of telephone numbers.

11. The method of claim 8, wherein said dialer circuit is a National Semiconductor TP5008 integrated circuit.

12. The method of manufacturing a device for automatically dialing a telephone number using a non-volatile memory circuit as in claim 8, by mechanically coupling a resilient button to said electrical switch, said electrical switch being capable of being momentarily placed in the on state by said resilient button.

13. The method of manufacturing a device for automatically dialing a telephone number as in claim 8, by protecting the input and the output of the connection of the non-volatile memory circuit to the telephone network wire with a surge protecting circuit.

* * * * *